Jan. 31, 1950     E. J. ALLMAN     2,495,952
WHEEL FOR AGRICULTURAL MACHINES
Filed Dec. 28, 1946     3 Sheets-Sheet 2
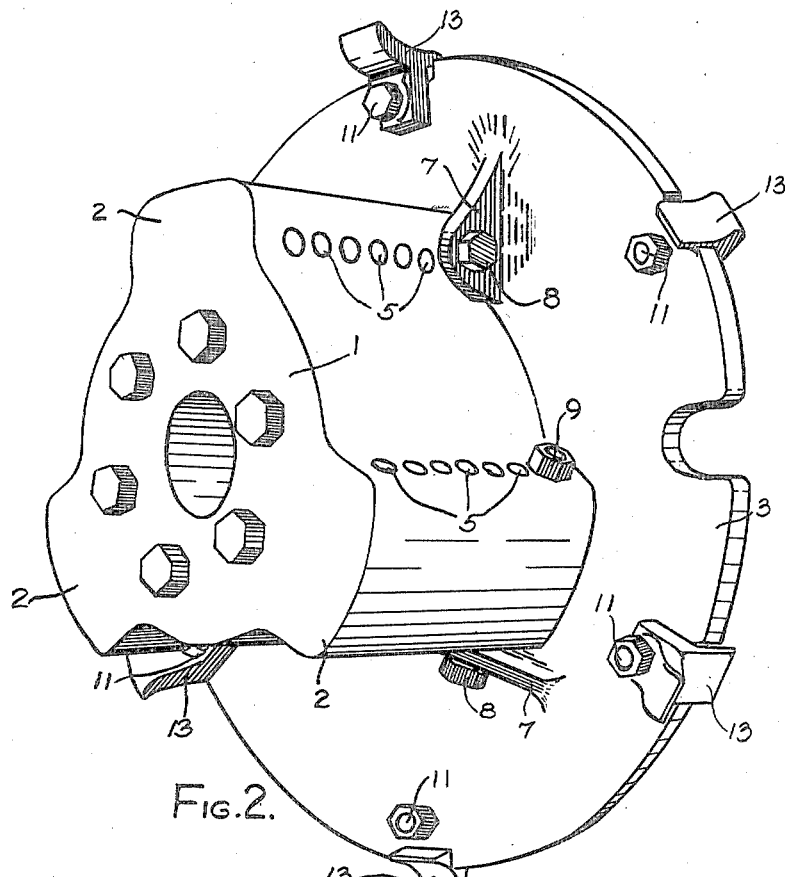
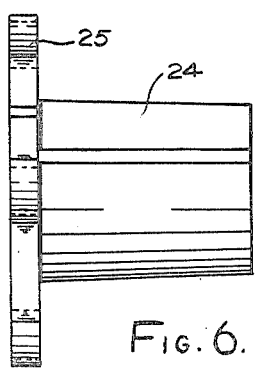
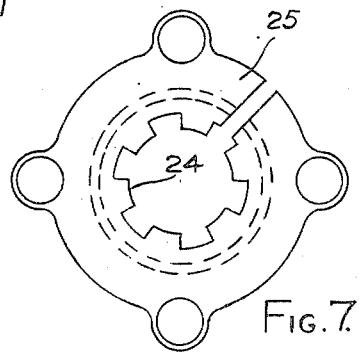
INVENTOR
Ernest James Allman,
BY
ATTORNEY.

Jan. 31, 1950     E. J. ALLMAN     2,495,952
WHEEL FOR AGRICULTURAL MACHINES

Filed Dec. 28, 1946     3 Sheets—Sheet 3

INVENTOR
Ernest James Allman,
BY
ATTORNEY.

Patented Jan. 31, 1950

2,495,952

UNITED STATES PATENT OFFICE 2,495,952

WHEEL FOR AGRICULTURAL MACHINES

Ernest James Allman, Chichester, England

Application December 28, 1946, Serial No. 719,058
In Great Britain March 18, 1946

2 Claims. (Cl. 301—9)

This invention relates to disc wheels for agricultural tractors and other agricultural machines, in which the wheel rim is removably carried by a centre disc supported at its middle on a hub.

An object of the invention is to enable the spacing between pairs of wheels on their axle to be adjusted in a simple manner to suit the variations in spacing of different row crops, while at the same time providing for firm fixture of the wheels on their hubs and relief of the fixing bolts from driving stresses likely to shear the bolts.

Another object of the invention is to transfer the bulk of the weight of the wheel nearer to the axis of rotation, and so reduce the centrifugal force acting at the rim, thereby ensuring more effective wheel grip.

A tractor wheel or like wheel according to the invention comprises a hub having one or more longitudinal ribs, each provided with a longitudinally disposed row of bolt holes, a wheel disc having a central opening to permit of it being slid along the hub and also having an apertured lug to be bolted to each rib by a bolt passed through it when the disc is adjusted to bring the lug opposite to one of the bolt holes in the rib.

In order to relieve the bolt or bolts of stress likely to shear them, the bolt holes are preferably arranged tangentially to a circle concentric with the axis of rotation of the wheel.

The opening in the driving disc is preferably so shaped and of such size as to allow sufficient clearance to permit of the disc being slid along the hub fairly freely during adjustment but so that the edge of the opening may be in contact with the ribs when the disc is bolted to the hub, in order that the driving effort may be taken directly by the disc.

The lugs may be arranged flush with the edge of the opening in the disc, so that they are in contact with the ribs when bolted thereto and take some of the driving effort.

While it is possible to arrange that the whole of the driving effort is transmitted by the ribs through the lugs to the disc, it will be appreciated that it is better to distribute the stress as above described.

In the accompanying drawings:

Figure 2 is a perspective view of the hub with the wheel disc in one selected position thereon.

Figures 6 and 7 are side and end elevations of a split cone for use with the hub when secured to a splined shaft.

Figure 1:
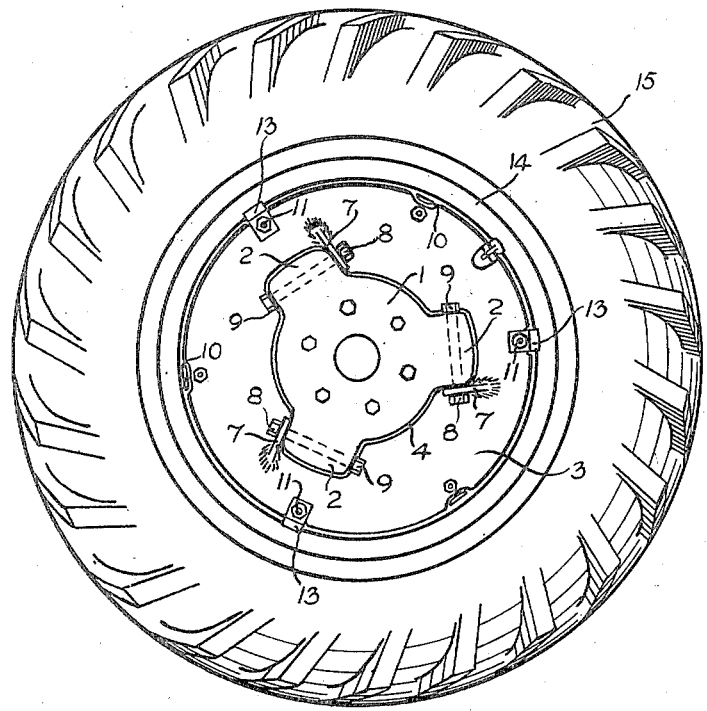
Figure 1 is a side view of a tractor wheel fitted on one form of hub according to the invention.

In one example, the hub 1 is formed with three radial ribs 2 extending lengthwise or axially of the hub and in equispaced angular relation. The centre disc 3 is formed with an opening 4 of appropriate shape so that the centre disc 3 can be slid axially along the ribs 2.

Each rib 2 has a row of lateral bolt holes 5, which pass entirely therethrough from side to side, that is, tangentially to a circle which is concentric with the hub, the row extending in the direction of the length of the rib 2.

An apertured lug 7 is formed or welded in an appropriate position on the centre disc 3 for each rib 2 so that it projects outwards from the face of the disc.

Bolts 8 are passed through the lugs 7 and through selected holes 5 of the rows in the ribs and fixed by securing nuts 9.

The lugs 7 are so arranged that when the disc 3 is bolted on the hub 1 each lug is in advance of the complementary rib 2 in the forward travel of the wheel, so that a forward drive from the hub to the rim is effected by engagement of the rib 2 with the centre disc 3, thus relieving the bolts 9 of any strain.

When the wheel is to be adjusted axially, the bolts 8 are removed, the centre disc 3 is slid axially along the ribs 2 and the bolts 8 are passed through those holes 5 of the rows in the ribs 2 that are brought opposite to the lugs 7 by such axial adjustment of the centre disc 3.

Figure 5:
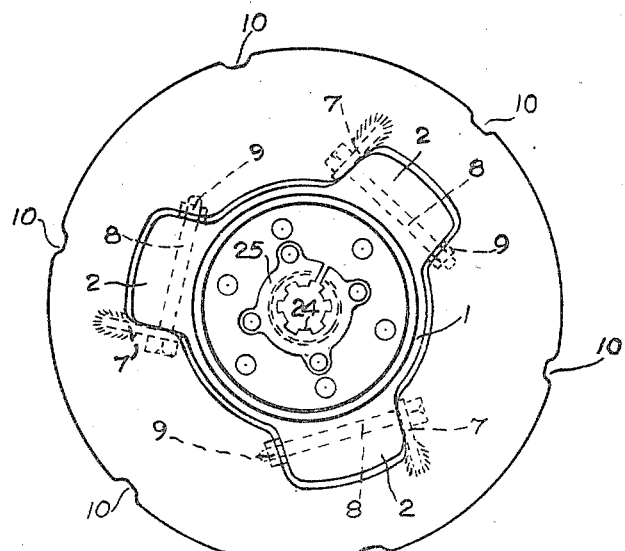
Figure 5 is a side elevation of a hub as seen in the direction of the arrow V, Figure 4, with a wheel disc bolted to it.

In Figures 1 and 5, the clearance between the ribs and the edge of the aperture in the disc 3 is somewhat exaggerated for the sake of clearness, but it will be understood that it should only be sufficient to permit of the disc being adjusted freely on the hub. When the bolts 8 are tightened, the driving faces of the ribs makes contact with the adjacent edges of the aperture in the disc and if the lugs are flush with these edges, they may take some of the thrust.

The centre disc 3 is formed with notches 10, Figures 1 and 5, in its outer periphery and with holes for bolts 11 adjacent to its outer periphery for attachment of clips 13 for a rim 14, which may be one adapted to carry a tyre 15, as indicated in Figure 1.

Figure 3:
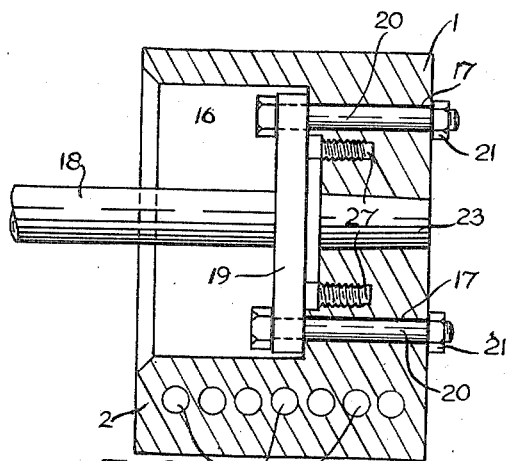
Figures 3 and 4 are longitudinal sections of the hub secured to a flanged shaft and a splined shaft, respectively.

The hub 1 is provided with an enlarged bore 16 and bolt holes 17 to enable it to be secured to an axle 18 having a flange 19 provided with bolt holes for bolts 20 passing through the holes 17 and fastened by nuts 21, as shown in Figure 3.

Figure 4:
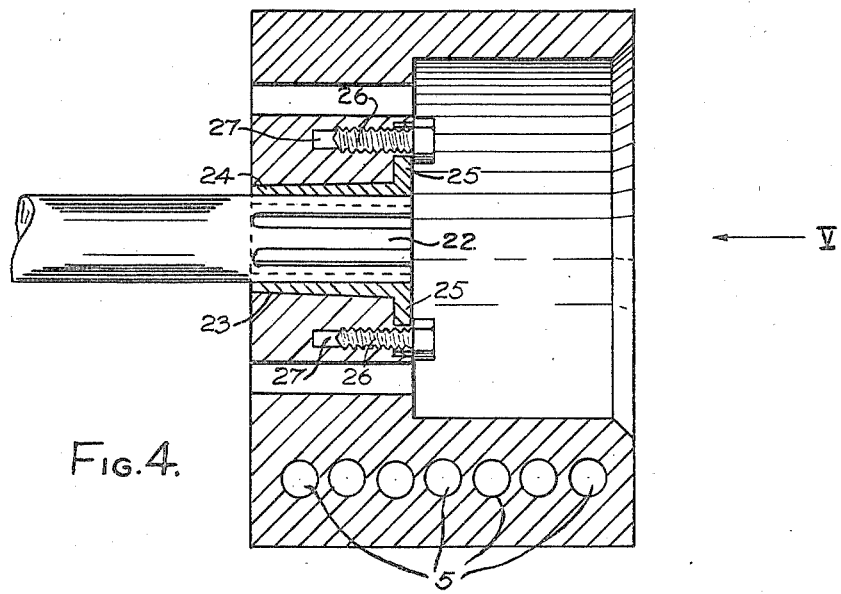

To enable the hub 1 to be fitted to a splined axle 22, as indicated in Figure 4, it is provided with a conical bore 23 for the reception of an internally splined split conical sleeve 24, which has a flange 25 secured by screws 26 passing into screw threaded holes 27 in the hub.

The hub can be used with discs 3 of different diameters to suit rims of different diameters. While the hub in the example has three ribs 2, the invention is not limited to any particular number, as even a single rib may suffice with a light wheel.

I claim:

1. In a wheel, a rim supporting plate and a hub, said hub having a plurality of radial ribs and said plate having a central opening conforming in shape to said hub and slidable therealong, said ribs each having a series of transverse openings spaced therealong, lugs on said plate, and bolts each passing through a selected rib opening and through a respective lug.

2. In a wheel, a rim supporting plate and a hub, said hub having a plurality of radial ribs and said plate having a central opening conforming in shape to said hub and slidable therealong, said ribs each having a series of transverse openings spaced therealong, lugs on said plate, and bolts each passing through a selected rib opening and through a respective lug, said lugs engaging against the sides of said ribs, whereby the driving torque on the hub is taken by said lugs and the bolts are free from driving torque.

ERNEST JAMES ALLMAN.

REFERENCES CITED

The following references are of record in the file of this patent:

UNITED STATES PATENTS

| Number | Name | Date |
| --- | --- | --- |
| 1,406,759 | Putnam | Feb. 14, 1922 |
| 2,129,807 | Beckman et al. | Sept. 13, 1938 |